United States Patent
Kaynar et al.

(10) Patent No.: US 12,420,925 B2
(45) Date of Patent: Sep. 23, 2025

(54) LOCKING MECHANISM

(71) Applicant: TUSAS-TURK HAVACILIK VE UZAY SANAYII ANONIM SIRKETI, Kahramankazan/Ankara (TR)

(72) Inventors: Nimet Gul Kaynar, Kahramankazan/Ankara (TR); Durmus Ali Sahin, Kahramankazan/Ankara (TR); Fatih Turk, Kahramankazan/Ankara (TR)

(73) Assignee: TUSAS—TUR HAVACILIK VE UZAY SANYII ANONIM SIRKETI, Kahramankazan/Ankara (TR)

( * ) Notice: Subject to any disclaimer, the term of this patent is extended or adjusted under 35 U.S.C. 154(b) by 0 days.

(21) Appl. No.: 18/695,246

(22) PCT Filed: Sep. 27, 2022

(86) PCT No.: PCT/TR2022/051046
§ 371 (c)(1),
(2) Date: Mar. 25, 2024

(87) PCT Pub. No.: WO2023/055325
PCT Pub. Date: Apr. 6, 2023

(65) Prior Publication Data
US 2025/0145288 A1    May 8, 2025

(30) Foreign Application Priority Data
Sep. 30, 2021 (TR) ................ 2021/015322

(51) Int. Cl.
*B64D 1/04*    (2006.01)
(52) U.S. Cl.
CPC .................... *B64D 1/04* (2013.01)
(58) Field of Classification Search
CPC ....................................... B64D 1/04
(Continued)

(56) References Cited

U.S. PATENT DOCUMENTS

| | | | | |
|---|---|---|---|---|
| 2,440,723 | A | * | 5/1948 | Macdonald ............ F41F 3/058 89/1.804 |
| 2,466,980 | A | * | 4/1949 | Bronson ................ B64D 1/04 294/82.26 |

(Continued)

FOREIGN PATENT DOCUMENTS

| | | |
|---|---|---|
| CN | 208802149 U | 4/2019 |
| CN | 111572798 A | 8/2020 |

(Continued)

OTHER PUBLICATIONS

International Search Report and Written Opinion for PCT application No. PCT/TR2022/051046, mailed Jan. 27, 2023.

*Primary Examiner* — Samir Abdosh
(74) *Attorney, Agent, or Firm* — Notaro, Michalos & Zaccaria P.C.

(57) ABSTRACT

A locking mechanism has a body located on an air vehicle where at least one useful load is located on the body and at least one launcher is located on the body which enables the launch and/or release of the useful loads contained therein. A trigger that contacts the useful load on the launcher allows the useful loads to be launched and/or released from the body. A rod extends longitudinally in the launcher, wherein when the trigger is moved, the rod moves on an axis that the launcher extends an arm that is in contact with the rod. A first spring located on the rod allows the rod to be triggered when the energy stored thereon is released. A tab extending outward from the arm holds the useful load.

13 Claims, 3 Drawing Sheets

(58) Field of Classification Search
 USPC .............................................................. 89/1.8
 See application file for complete search history.

(56) References Cited

U.S. PATENT DOCUMENTS

| | | | | |
|---|---|---|---|---|
| 9,783,296 | B2 * | 10/2017 | Ray ........................... | B64D 1/06 |
| 10,933,997 | B2 * | 3/2021 | Hayes ..................... | B64U 10/14 |
| 2014/0048654 | A1 * | 2/2014 | Williamson ............. | B64D 1/12 |
| | | | | 244/137.4 |

FOREIGN PATENT DOCUMENTS

| | | | | | |
|---|---|---|---|---|---|
| CN | 213566480 | U | | 6/2021 | |
| DE | 102010008729 | A1 | * | 8/2011 | ............... B64D 1/04 |
| EP | 0141672 | A1 | | 5/1985 | |
| FR | 2894560 | A1 | * | 6/2007 | ............... B64D 1/04 |

* cited by examiner

LOCKING MECHANISM

The present invention relates to launchers that allow the launch of useful loads on aircraft, helicopters or unmanned aerial vehicles.

Aircraft, helicopters or unmanned aerial vehicles have launchers that allow the launch of rocket-like ammunition used for launching during operation. During the operation, a current is applied to the triggers that contact the useful load, so that the ammunition is provided with moving force by means of the electrical systems provided on the launchers. The ammunition is launched from the air vehicle by the propulsion provided by the trigger.

CN111572798, which is included in the known-state of the art, discloses a launcher design provided on unmanned aerial vehicles. Said patent document discloses a mechanism involved in attaching and locking the ammunition to the air vehicle.

A locking mechanism according to the present invention provides a system which allows the effective removal and installation of ammunition on aircraft, helicopters or unmanned aerial vehicles.

Another object of the present invention is to provide a solution to the safety problems caused by the attachment of ammunition to the launchers.

The locking mechanism realized to achieve the object of the present invention, which is defined in the first claim and other claims dependent thereon, comprises a body located on an aircraft, a helicopter, or an unmanned aerial vehicle; at least one useful load (F), e.g. an ammunition, located on the body; a launcher which contains the useful loads (F) and allows the useful loads (F) to be launched from the body; a trigger which contacts the useful load (F) on the launcher and allows the useful loads (F) to be launched from the body by means of the driving power; a rod extending longitudinally in the launcher and capable of moving on the axis it extends; at least one arm in contact with the rod; a first spring located on the rod for storing energy; a tab extending outward from the arm, thereby holding the useful load (F).

The locking mechanism according to the invention comprises the trigger which has an open position (I), wherein if the trigger is triggered by the user, the trigger pulls the rod to allow the arm to release the useful load (F), thus breaking the contact between the tab and the useful load (F); and a locked position (II), wherein the trigger is pushed by the user in contact with the useful load (F) so as to activate the rod, thereby allowing the tab on the arm to come into contact with the useful load (F), wherein the trigger is brought from the open position (I) to the locked position (II) by rotating.

In an embodiment of the invention, the locking mechanism comprises an eccentric structure located on the rod in contact with the arm; a first surface located on the eccentric structure and allowing contact with the arm; at least a second surface located on the rod and extending at an inclined angle relative to the first surface and the axis on which the first surface extends.

In an embodiment of the invention, the locking mechanism comprises a first part on the arm, which is form-compatible with the first surface and allows the first surface to fit thereon; at least a second part on the arm, which is form-compatible with the second surface.

In an embodiment of the invention, the locking mechanism comprises a moment point on the launcher, at which the arm comes into contact with the launcher; the arm which rotates around the moment point when the first surface is substantially disconnected from the first part and pushes the second surface, as the trigger (4) is moved from the locked position (II) to the open position (I); the tab which allows the useful load (F) to be released upon rotation of the arm.

In an embodiment of the invention, the locking mechanism comprises a protrusion located on the useful load (F), substantially opposite to the tab, which allows the useful load (F) to be removably attached to the tab.

In an embodiment of the invention, the locking mechanism comprises a casing within the launcher, which contains the rod, arm and first spring.

In an embodiment of the invention, the locking mechanism comprises a first housing in the casing, which allows the eccentric structure to move in a determined direction; a second housing limiting the movement of the arm.

In an embodiment of the invention, the locking mechanism comprises a stopper located on the arm, substantially opposite to the first spring, which limits the movement of the first spring that is pressed when the trigger moves from the locked position (II) to the open position (I), and is stretched when the trigger moves from the open position (I) to the locked position.

In an embodiment of the invention, the locking mechanism comprises the spring which is located to substantially surround the rod, wherein the spring is compressed when the trigger is in the open position (I), wherein the spring triggers the rod when the rod moves from the open position (I) to the locked position (II), allowing the eccentric structure to create a pressure force on the protrusion provided on the arm, thereby separating the tab from the useful load (F) and releasing the useful load (F).

In an embodiment of the invention, the locking mechanism comprises the tab which is form-compatible with the useful load (F) in an attachable and detachable manner.

In an embodiment of the invention, the locking mechanism comprises an extension which extends in the direction that the arm extends; a second spring which is connected to the casing at one end and connected to the extension at the other end, wherein the second spring creates a pressing force to prevent the tab from disengaging when the trigger is in the locked position (II).

In an embodiment of the invention, the locking mechanism comprises at least one substantially form-compatible guide on the launcher, which allows the useful load (F) to be removably attached on the launcher in a predetermined manner.

In an embodiment of the invention, the locking mechanism comprises the eccentric structure having at least partially a concave form in the region where it is opposite to the first part, and having at least partially a convex form in the region where it contacts with the second part in an opposite manner, so that the eccentric structure is substantially form-compatible with the first part and the second part.

The locking mechanism realized to achieve the object of the present invention is illustrated in the attached drawings, in which.

Figure 1:
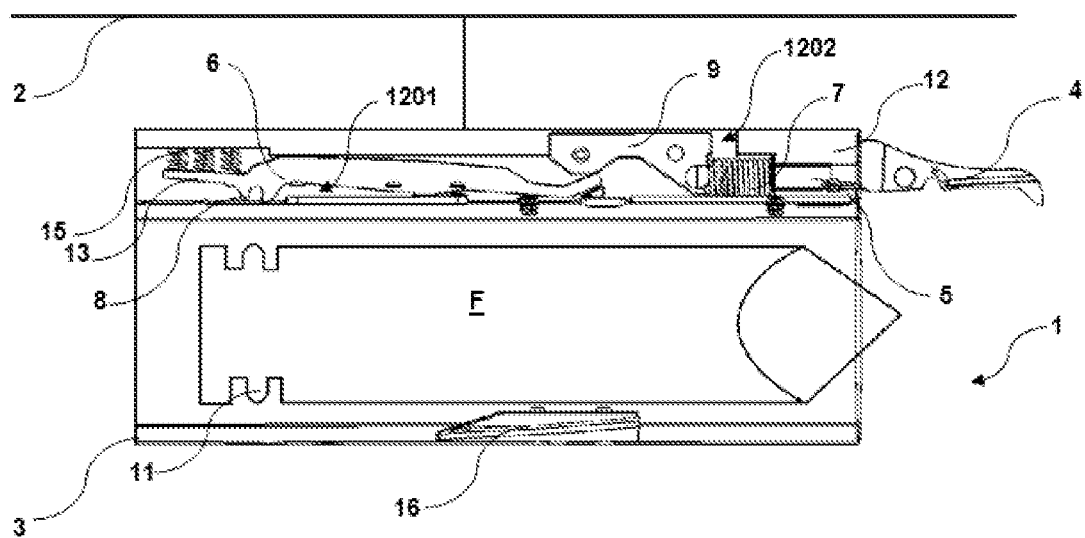
FIG. 1 is a perspective view of the locking mechanism.
Figure 2:
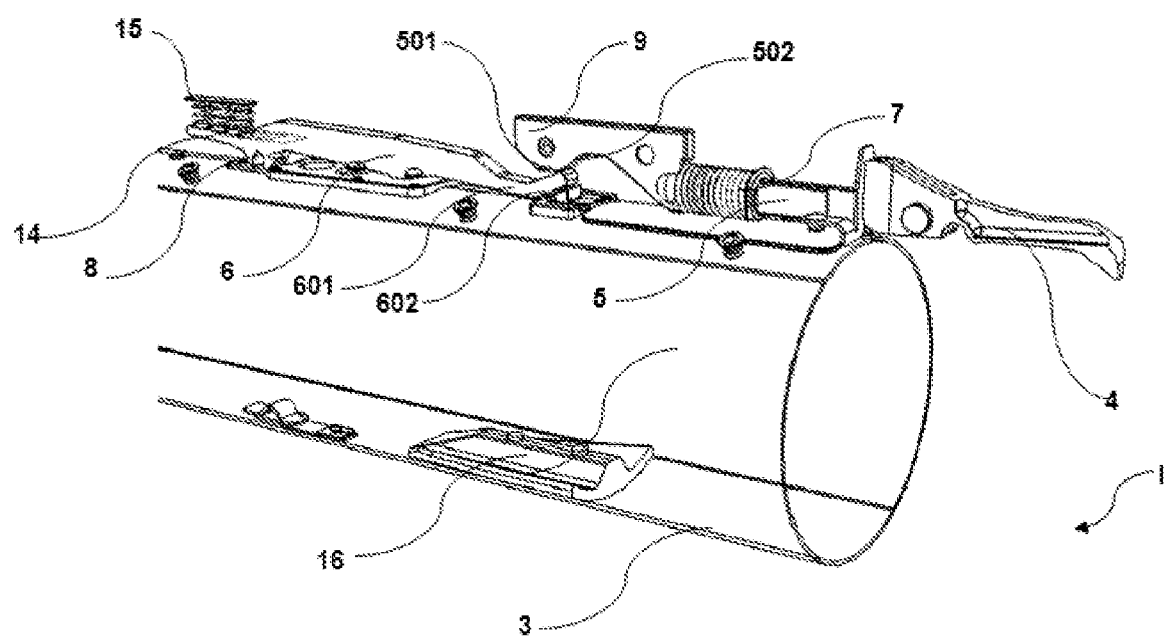
FIG. 2 is a perspective view with the trigger in the open position (I).
Figure 3:
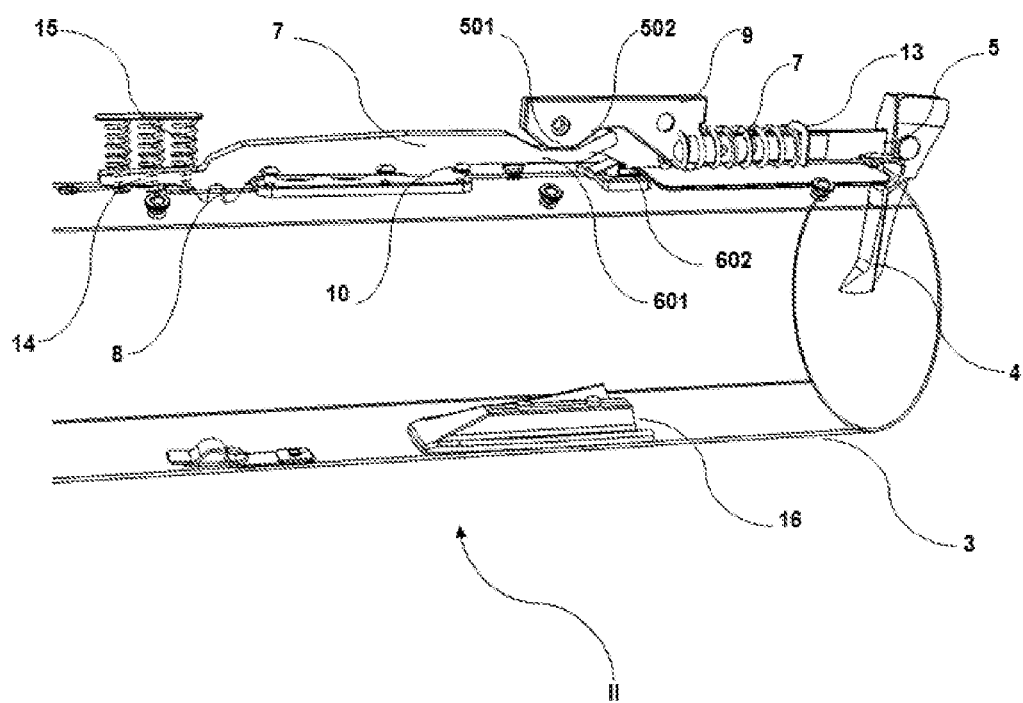
FIG. 3 is a perspective view with the trigger in the locked position (II).

All the parts illustrated in figures are individually assigned a reference numeral and the corresponding terms of these numbers are listed below:

1. Locking Mechanism
2. Body
3. Launcher
4. Trigger
5. Rod

501. First Surface
502. Second Surface
6. Arm
   601. First Part
   602. Second Part
7. First Spring
8. Tab
9. Eccentric Structure
10. Moment Point
11. Protrusion
12. Casing
   1201. First Housing
   1202. Second Housing
13. Stopper
14. Extension
15. Second Spring
16. Guide The locking mechanism (1) comprises a body (2) located on an air vehicle; at least one useful load (F) located on the body (2); at least one launcher (3) located on the body (2), which enables the launch and/or release of the useful loads (F) contained therein; a trigger (4) which contacts the useful load (F) on the launcher (3) and allows the useful loads (F) to be launched and/or released from the body (2); a rod (5) extending longitudinally in the launcher (3), wherein when the trigger (4) is moved, the rod (5) can move on an axis that the launcher (3) extends; an arm (6) that is in contact with the rod (5); a first spring (7) located on the rod (5), which allows the rod (5) to be triggered when the energy stored thereon is released; a tab (8) extending outward from the arm (6) to hold the useful load (F).

The locking mechanism (1) according to the invention comprises the trigger (4) which has an open position (I), wherein if the trigger (4) is triggered by the user, the trigger (4) pulls the rod (5) to allow the arm (6) to release the useful load (F), thus breaking the contact between the tab (8) and the useful load (F); and a locked position (II), wherein the trigger (4) is pushed by the user in contact with the useful load (F) so as to activate the rod (5), thereby allowing the tab (8) on the arm (6) to come into contact with the useful load (F), wherein the trigger (4) is brought from the open position (I) to the locked position (II) by rotating.

There are launchers (3) which allow installation of useful loads (F), e.g. ammunition, on the body (2) on the aircraft, helicopter or unmanned aerial vehicle, and allow launch of the useful loads (F) during operation. While launching the useful loads (F) on the launcher (3), current is applied to the trigger (4), so that the useful load (F) is driven to provide ignition. A rod (5) is provided on the launcher (3), which can move on the axis it extends with the movement of the trigger (4). An arm (6) is located on the launcher (3), which is connected to the useful load (F) at one end and moves with the movement of the rod (5). There is a first spring (7) which is compressed when the trigger (4) is pulled and rotated by the user. A tab (8) is provided on the arm (6), which contacts the useful load (F) and is form-compatible where the useful load (F) is attached.

The trigger (4) is pulled and rotated to the open position (I) by the user. The rod (5) moves and creates a pressure force at one end of the arm (6) and thus, the tab (8) located at the other end of the arm (6) is separated from the useful load (F) so that the useful load (F) is released. Therefore, the useful load (F) can be replaced by a new one by the user. The useful load (F) is placed on the launcher (3) and the trigger (4) is pushed by the user. In this way, the trigger (4) is contacted with the useful load (F) and the trigger (4) is brought to the locked position.

In an embodiment of the invention, the locking mechanism (1) comprises an eccentric structure (9) located on the rod (5) in contact with the arm (6); a first surface (501) which provides contact with the arm (6) on the eccentric structure (9); at least a second surface (502) extending to be inclined with the direction along which the first surface (501) extends. The rod (5) contacts the arm (6) through the first surface (501) and the second surface (502). The movement of the rod (5) is transferred to the arm (6) by the first surface (501) and the second surface (502).

In an embodiment of the invention, the locking mechanism (1) comprises a first part (601) located on the arm (6), which is form-compatible with the first surface (501) and opposite to the first surface (501) such that that the first surface (501) fits thereon; a second part (602) located opposite to the second surface (502) on the arm (6). Therefore, when the trigger (4) is in the locked position (II), the first surface (501) and the first part (601) overlap each other and the second surface (502) and the second part (602) overlap each other, substantially in a form-compatible manner.

In an embodiment of the invention, the locking mechanism (1) comprises a moment point (10) on the launcher (3), at which the arm (6) comes into contact with the launcher (3); the arm (6) which rotates around the moment point (10) when the first surface (501) is substantially disconnected from the first part (601) and pushes the second surface (502), as the trigger (4) is moved from the locked position (II) to the open position (I); the tab (8) which allows the useful load (F) to be released upon rotation of the arm (6). When the trigger (4) is in the open position (I), the rod (5) moves in the direction it extends. The arm (6) acts as a lever when it is rotated around the moment point (10) when the first surface (501) presses the second part (602). Therefore, the tab (8) is disengaged to release the useful load (F) from the launcher (3). When needed, the useful load (F) is replaced with a new one by the manufacturer.

In an embodiment of the invention, the locking mechanism (1) comprises a protrusion (11) located on the useful load (F), opposite to the tab (8), which allows the useful load to be removably attached to the tab. Since the protrusion (11) has a form-compatible structure with the tab (8), the useful load (F) is effectively held.

In an embodiment of the invention, the locking mechanism (1) comprises a casing (12) located in the launcher (3), which contains the rod (5), the arm (6) and the first spring (7). In this way, the casing (12) protects the rod (5), the arm (6) and the first spring (7).

In an embodiment of the invention, the locking mechanism (1) comprises a first housing (1201) located in the casing (12), which allows the movement of the eccentric structure (9) to be guided; a second housing (1202) limiting the movement of the arm (6). The first housing (1201) limits the movement of the eccentric structure (9), which moves with the movement of the rod (5), allowing it to move only in a determined direction. The second housing (12) allows the movement of the arm (6) to be guided.

In an embodiment of the invention, the locking mechanism (1) comprises a stopper (13) located on the arm (6), opposite to the first spring (7), which limits the movement of the first spring (7) that is pressed when the trigger (4) moves from the locked position (II) to the open position (I), and is stretched when the trigger (4) moves from the open position (I) to the locked position. The stopper (13) limits the movement of the first spring (7) upon contact with the first spring (7).

In an embodiment of the invention, the locking mechanism (1) comprises the first spring (7) which is located to surround the rod (5) and is compressed when the trigger (4) is in the open position, wherein the first spring (7) triggers the rod (5) while the rod (5) moves from the open position (I) to the locked position (II), thereby allowing the eccentric structure (9) to create a pressure force on the protrusion (11) located on the arm (6), and allowing the tab (8) to be separated from the useful load (F). The trigger (4) is pulled and rotated by the user so as to be brought to the open position (I). The first spring (7) is compressed and the first spring (7) is set when the trigger (4) is brought to the locked position (II). Therefore, the first spring (7) provides precision to the trigger (4), allowing the system to operate safely.

In an embodiment of the invention, the locking mechanism (1) comprises the tab (8) which is form-compatible with the protrusion (11) on the useful load (F), such that the tab (8) is removably attached to the protrusion (11). In this way, the useful load (F) is held by the tab (8) more effectively.

In an embodiment of the invention, the locking mechanism (1) comprises an extension (14) which extends in the direction that the arm (6) extends; a second spring (15) which is connected to the casing (12) at one end and connected to the extension (14) at the other end, wherein the second spring (15) allows the necessary pressure to be created to removably attach the tab (8) on the protrusion (11).

In an embodiment of the invention, the locking mechanism (1) comprises at least one guide (16) located on the launcher (3), which allows the useful load (F) to be removably attached to the launcher (3) in a position predetermined by the user. The useful load (F) is attached to the launcher (3) by means of the guide (16). In this way, problems which occur when the useful load (F) is attached to the launcher (3) in different positions, such as seizing, delayed ignition or explosion, are prevented.

In an embodiment of the invention, the locking mechanism (1) comprises the eccentric structure (9) having a concave form in the region where it is opposite to the first part (601), and having a convex form in the region where it contacts the second part (602) in an opposite manner, so that the eccentric structure (9) is substantially form-compatible with the first part (601) and the second part (602). Therefore, the rod (5) can trigger the arm (6) and rotate the arm (6) around the moment point (10).

The invention claimed is:

1. A locking mechanism (1) comprising:
   a body (2) located on an air vehicle;
   at least one useful load (F) located on the body (2);
   at least one launcher (3) located on the body (2), which enables the launch and/or release of the useful loads (F) contained therein;
   a trigger (4) which contacts the useful load (F) on the launcher (3) and allows the useful loads (F) to be launched and/or released from the body (2);
   a rod (5) extending longitudinally in the launcher (3), wherein when the trigger (4) is moved, the rod (5) moves on an axis that the launcher (3) extends;
   an arm (6) that is in contact with the rod (5);
   a first spring (7) located on the rod (5), which allows the rod (5) to be triggered when the energy stored thereon is released;
   a tab (8) extending outward from the arm (6) to hold the useful load (F); and
   wherein the trigger (4) has an open position (I), wherein when the trigger (4) is triggered by the user, the trigger (4) pulls the rod (5) to allow the arm (6) to release the useful load (F), thus breaking the contact between the tab (8) and the useful load (F), and a locked position (II), wherein the trigger (4) is pushed by the user in contact with the useful load (F) so as to activate the rod (5), thereby allowing the tab (8) on the arm (6) to come into contact with the useful load (F), wherein the trigger (4) is brought from the open position (I) to the locked position (II) by a rotation thereof.

2. The locking mechanism (1) according to claim 1, comprising:
   an eccentric structure (9) located on the rod (5) in contact with the arm (6);
   a first surface (501) which provides contact with the arm (6) on the eccentric structure (9); and
   at least a second surface (502) extending to be inclined with the direction along which the first surface (501) extends.

3. The locking mechanism (1) according to claim 2, comprising:
   a first part (601) located on the arm (6), which is form-compatible with the first surface (501) and located opposite to the first surface (501) such that that the first surface (501) fits thereon; and
   a second part (602) located opposite to the second surface (502) on the arm (6).

4. The locking mechanism (1) according to claim 3, comprising:
   a moment point (10) on the launcher (3), at which the arm (6) comes into contact with the launcher (3), wherein the arm (6) rotates around the moment point (10) when the first surface (501) is substantially disconnected from the first part (601) and pushes the second surface (502), as the trigger (4) is moved from the locked position (II) to the open position (I), and wherein the tab (8) allows the useful load (F) to be released upon rotation of the arm (6).

5. The locking mechanism (1) according to claim 1, comprising a protrusion (11) located on the useful load (F), opposite to the tab (8), which allows the useful load (F) to be removably attached to the tab.

6. The locking mechanism (1) according to claim 1, comprising a casing (12) located in the launcher (3), which contains the rod (5), the arm (6) and the first spring (7).

7. The locking mechanism (1) according to claim 6, comprising:
   a first housing (1201) located in the casing (12), which allows the movement of the eccentric structure (9) to be guided; and
   a second housing (1202) limiting the movement of the arm (6).

8. The locking mechanism (1) according to claim 1, comprising a stopper (13) located on the arm (6), opposite to the first spring (7), which limits the movement of the first spring (7) that is pressed when the trigger (4) moves from the locked position (II) to the open position (I), and is stretched when the trigger (4) moves from the open position (I) to the locked position.

9. The locking mechanism (1) according to claim 5, wherein the first spring (7) is located to surround the rod (5) and is compressed when the trigger (4) is in the open position (I), wherein the first spring (7) triggers the rod (5) while the rod (5) moves from the open position (I) to the locked position (11), thereby allowing the eccentric structure (9) to create a pressure force on the protrusion (11) located on the arm (6), and allowing the tab (8) to be separated from the useful load (F).

10. The locking mechanism (1) according to claim 5, wherein the tab (8) is form-compatible with the protrusion (11) on the useful load (F), such that the tab (8) is removably attached to the protrusion (11).

11. The locking mechanism (1) according to claim 6, comprising:
    an extension (14) which extends in the direction that the arm (6) extends; and
    a second spring (15) which is connected to the casing (12) at one end and connected to the extension (14) at the other end, wherein the second spring (15) allows the necessary pressure to be created to removably attach the tab (8) on the protrusion (11).

12. The locking mechanism (1) according to claim 1, wherein at least one guide (16) is located on the launcher (3) and allows the useful load (F) to be removably attached to the launcher (3) in a position predetermined by the user.

13. The locking mechanism (1) according to claim 3, wherein the eccentric structure (9) has a concave form in a region where it is opposite to the first part (601), and having a convex form in a region where it contacts the second part (602) in an opposite manner, so that the eccentric structure (9) is substantially form-compatible with the first part (601) and the second part (602).

\* \* \* \* \*